(12) United States Patent
Botrel et al.

(10) Patent No.: US 11,988,108 B2
(45) Date of Patent: May 21, 2024

(54) TURBINE VANE INCLUDING A COOLING-AIR INTAKE PORTION INCLUDING A HELICAL ELEMENT FOR SWIRLING THE COOLING AIR

(71) Applicant: SAFRAN AIRCRAFT ENGINES, Paris (FR)

(72) Inventors: Erwan Daniel Botrel, Alfortville (FR); Sébastien Serge Francis Congratel, La Brosse Montceaux (FR); Simon Parinet, Brunoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/306,205

(22) PCT Filed: May 31, 2017

(86) PCT No.: PCT/FR2017/051359
§ 371 (c)(1),
(2) Date: Nov. 30, 2018

(87) PCT Pub. No.: WO2017/207924
PCT Pub. Date: Dec. 20, 2017

(65) Prior Publication Data
US 2019/0292918 A1   Sep. 26, 2019

(30) Foreign Application Priority Data
Jun. 2, 2016 (FR) .................... 16 55014

(51) Int. Cl.
*F01D 5/18* (2006.01)
*F01D 5/30* (2006.01)

(52) U.S. Cl.
CPC .............. *F01D 5/187* (2013.01); *F01D 5/30* (2013.01); *F01D 5/188* (2013.01);
(Continued)

(58) Field of Classification Search
CPC ....... F01D 5/18–189; F01D 5/30–3092; F01D 5/08–088; F01D 5/147; F05D 2250/15; F05D 2250/25
See application file for complete search history.

(56) References Cited

U.S. PATENT DOCUMENTS 2,570,155 A * 10/1951 Redding ................. F01D 9/041
138/39
2,691,281 A * 10/1954 Phillips ................. F25B 39/026
62/491
(Continued)

FOREIGN PATENT DOCUMENTS

DE     8305539 U1    6/1987
EP     1923537 A2    5/2008
(Continued)

OTHER PUBLICATIONS

Search Report issued in French Patent Application No. 1655014 dated Jan. 18, 2017.
(Continued)

*Primary Examiner* — Justin D Seabe
*Assistant Examiner* — Behnoush Haghighian
(74) *Attorney, Agent, or Firm* — Pearne & Gordon LLP

(57) ABSTRACT

A turbine vane of a turbine engine such as a turboprop or a turbojet, the vane comprising a root supporting a blade, the vane including at least one air-circulation duct for cooling the air during operation, the duct including, at the vane root, an inlet portion for collecting the cooling air, the inlet portion extending away from a lower surface of the vane root opposite the blade. At least one inlet portion is provided with a helical element for rotating the cooling air in order to improve the cooling efficiency thereof.

14 Claims, 3 Drawing Sheets

(52) U.S. Cl.
CPC ...... *F05D 2230/21* (2013.01); *F05D 2230/31* (2013.01); *F05D 2240/127* (2013.01); *F05D 2250/15* (2013.01); *F05D 2250/25* (2013.01); *F05D 2260/2212* (2013.01); *Y02T 50/60* (2013.01)

(56) References Cited

U.S. PATENT DOCUMENTS

| | | | | |
|---|---|---|---|---|
| 2,864,405 | A * | 12/1958 | Young | F28F 13/12 138/38 |
| 4,119,390 | A * | 10/1978 | Dakin | F01D 5/185 416/96 R |
| 5,002,460 | A * | 3/1991 | Lee | F01D 5/188 415/115 |
| 5,203,436 | A * | 4/1993 | Wieting | B60J 5/0447 296/146.6 |
| 5,704,763 | A * | 1/1998 | Lee | F01D 5/188 415/115 |
| 5,993,156 | A * | 11/1999 | Bailly | F01D 5/188 416/96 A |
| 7,665,965 | B1 * | 2/2010 | Liang | F01D 5/18 416/1 |
| 8,272,218 | B2 * | 9/2012 | Fox | F02C 7/22 239/500 |
| 9,926,787 | B2 * | 3/2018 | Ahmad | F01D 9/065 |
| 2006/0062671 | A1 * | 3/2006 | Lee | F01D 5/20 416/92 |
| 2007/0212228 | A1 * | 9/2007 | Digard Brou De Cuissart | F01D 5/3007 416/97 R |
| 2008/0118366 | A1 * | 5/2008 | Correia | F01D 5/187 416/97 R |
| 2010/0139903 | A1 * | 6/2010 | Hatman | F28F 13/12 165/184 |
| 2011/0194944 | A1 * | 8/2011 | Grohens | G05D 23/025 416/97 R |
| 2012/0076665 | A1 * | 3/2012 | Janke | F01D 5/186 416/97 R |
| 2013/0195650 | A1 * | 8/2013 | Benson | F01D 5/187 416/1 |
| 2014/0140860 | A1 * | 5/2014 | Tibbott | F01D 5/187 416/97 R |
| 2014/0161626 | A1 * | 6/2014 | Podgorski | C04B 35/64 416/96 R |
| 2015/0159494 | A1 * | 6/2015 | Carrier | F01D 9/02 415/175 |
| 2015/0240649 | A1 * | 8/2015 | Botrel | F01D 5/081 416/97 R |
| 2015/0337667 | A1 * | 11/2015 | Slavens | F01D 5/18 416/1 |
| 2015/0361808 | A1 | 12/2015 | Botrel et al. | |
| 2016/0010466 | A1 * | 1/2016 | Lamson | F01D 25/24 60/772 |
| 2016/0010467 | A1 * | 1/2016 | Lamson | F02C 7/25 60/772 |
| 2017/0051420 | A1 | 2/2017 | Botrel | |
| 2017/0159567 | A1 * | 6/2017 | Spangler | F01D 25/08 |
| 2018/0187553 | A1 | 7/2018 | Coudert et al. | |

FOREIGN PATENT DOCUMENTS

| | | |
|---|---|---|
| EP | 2947273 A1 | 11/2015 |
| FR | 2995342 A1 | 3/2014 |
| WO | 2014175951 A2 | 10/2014 |

OTHER PUBLICATIONS

International Search Report issued in Application No. PCT/FR2017/051359 dated Sep. 6, 2017.
Written Opinion issued in Application No. PCT/FR2017/051359 dated Sep. 6, 2017.
Application document as-filed for patent application entitled: Turbine Vane Comprising a Blade With a Tub Including a Curved Pressure Side in a Blade Apex Region, U.S. Appl. No. 15/775,034, filed May 10, 2018.

* cited by examiner

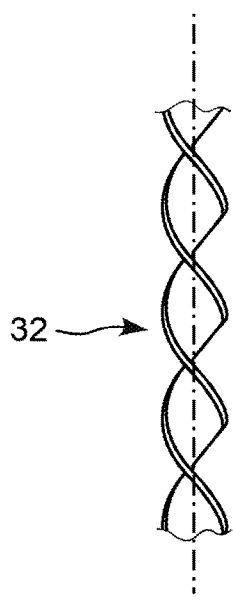
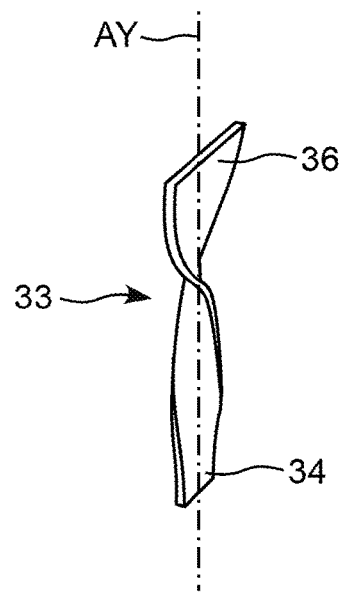
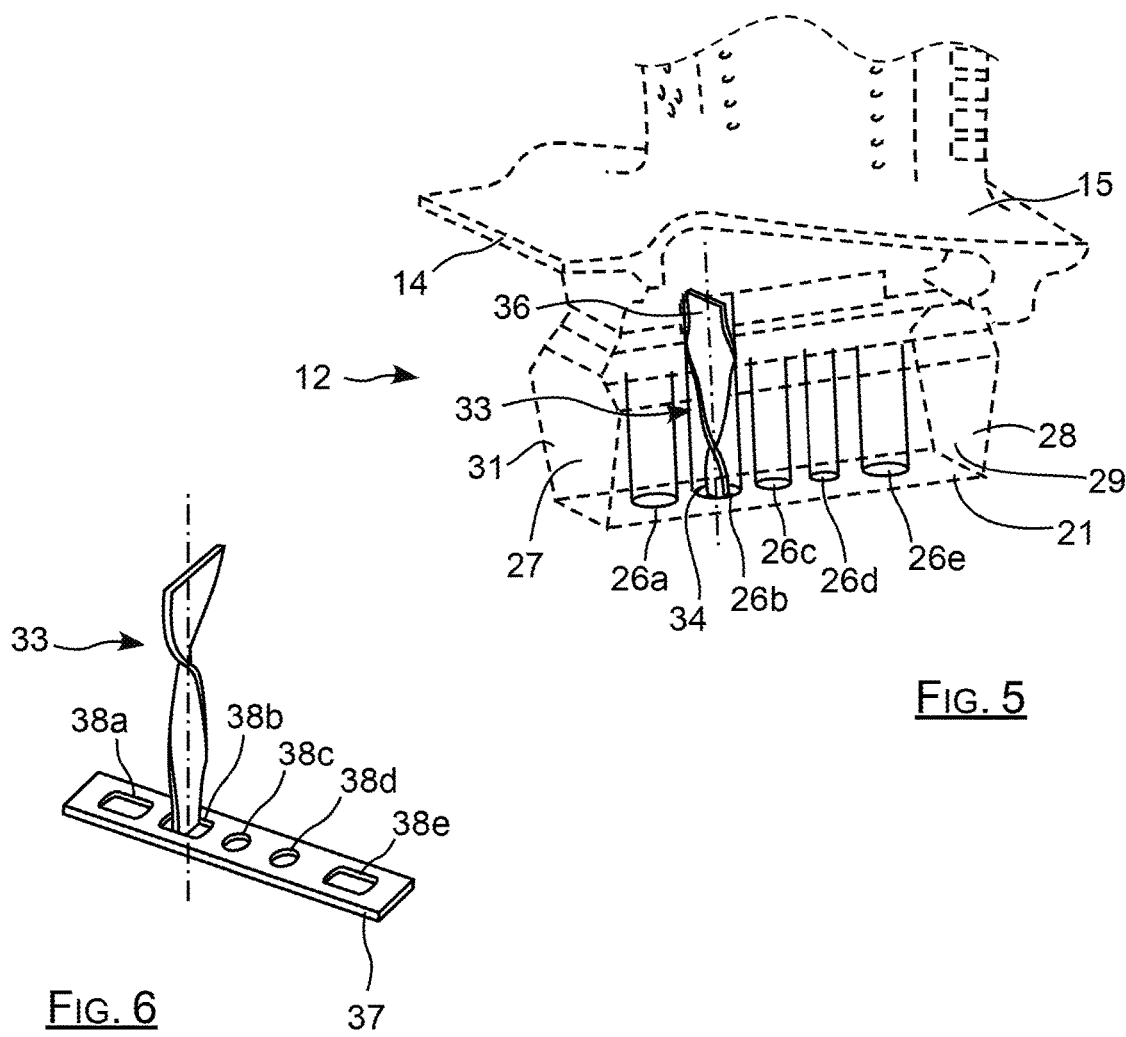
FIG. 3
FIG. 4
FIG. 5
FIG. 6

TURBINE VANE INCLUDING A COOLING-AIR INTAKE PORTION INCLUDING A HELICAL ELEMENT FOR SWIRLING THE COOLING AIR

This is the National Stage application of PCT international application PCT/FR2017/051359, filed on May 31, 2017 entitled "TURBINE VANE INCLUDING A COOLING-AIR INTAKE PORTION INCLUDING A HELICAL ELEMENT FOR SWIRLING THE COOLING AIR", which claims the priority of French Patent Application No. 16 55014 filed Jun. 2, 2016, both of which are incorporated herein by reference in their entirety.

TECHNICAL FIELD

The invention relates to a turbine vane intended to equip, for example, an aircraft engine of the bypass turbojet engine type or turboprop engine type, or an industrial gas turbine.

PRIOR ART

In such an engine 1 shown in FIG. 1, the outside air enters an intake duct 2 to pass through a fan 3 comprising a series of rotating blades before splitting into a central primary flow and a secondary flow encircling the primary flow.

The primary flow is then compressed in a first and a second compression stage 4 and 6 before entering a combustion chamber 7, after which it is expanded by passing through a set of turbines 8, before being discharged towards the rear while generating thrust. The secondary flow is directly propelled towards the rear by the fan in a flow path delimited by the casing 9 to generate additional thrust.

The expansion occurring in the turbines, which allows the compressor and the fan to be driven, takes place at a high temperature since it occurs immediately after combustion. Said turbine is thus designed and dimensioned such that it operates under harsh temperature, pressure and fluid flow rate conditions.

It comprises a series of vanes oriented radially and regularly spaced apart about a rotating shaft of the engine, and which are subjected to the harshest conditions with regard to the vanes of the first expansion stages of said turbine, i.e. the stages the closest to the combustion chamber 7, commonly referred to as high-pressure stages.

The increased performance requirements result in the design of engines of smaller sizes operating in harsher environments, which requires improving the cooling efficiency of these vanes.

This cooling takes place by circulating cooler air in said vanes, said air being withdrawn at the compressor and entering at the vane root in order to travel along internal circuits. This air is discharged via through-bores distributed over the wall of the vane and further creates, at the outer surface thereof, a film of air that is cooler than the surrounding air.

The use of this cooling air is disadvantageous in terms of performance as it is only re-injected into the primary flow at the blades, such that the energy required to compress it is not recovered in full in terms of thrust. This is why the vanes must be cooled as efficiently as possible using as little air as possible. In other words, the savings made for the cooling air reduce consumption specific to the engine.

For this purpose, internal regions of the vane comprise artifices, i.e. internal raised areas that disrupt the flow of air in order to increase the efficiency of the heat transfer. Moreover, the distribution of the flow is optimised to guarantee a minimum overpressure rate at the bores in order to prevent the need to re-inject hot air from the primary flow into the vane.

The purpose of the invention is to provide a solution for improving the transfer of heat from the vane to the cooling air.

DESCRIPTION OF THE INVENTION

For this purpose, the invention relates to a turbine vane of a turbine engine such as a turboprop or a turbojet engine, said vane comprising a root supporting a blade, said vane including at least one air-circulation duct for cooling it during operation, said duct including, at the vane root, an intake portion for collecting the cooling air, said intake portion extending away from a lower surface of the vane root opposite to the blade, characterised in that at least one intake portion is provided with a helical element for swirling the cooling air in order to improve the cooling efficiency thereof.

With this arrangement, the air input to cool the vane is immediately set into rotation at soon as it enters the vane root to favour increased heat exchange with the vane at the very start of its path therein.

The invention further relates to a vane thus defined, obtained by moulding and wherein each helical element is moulded with the vane.

The invention further relates to a vane thus defined, obtained by additive manufacturing.

The invention further relates to a vane thus defined, comprising a calibrated plate comprising holes for adjusting the rate of the intake air flow in each duct, said plate being fixed to the lower surface of the vane, and wherein each helical element is supported by said calibrated plate by being rigidly secured to said plate.

The invention further relates to a vane thus defined, wherein the calibrated plate is secured to the lower surface of the vane root by welding or brazing.

The invention further relates to a vane thus defined, comprising a helical element having a height which lies in the range twenty percent to one hundred percent of the height of the intake portion that it equips.

The invention further relates to a vane thus defined, comprising a helical element having a total torsional angle that lies in the range thirty degrees to one thousand and eighty degrees.

The invention further relates to a vane thus defined, comprising a helical element having a non-constant pitch, which decreases from the base of said element to the apex of said element.

The invention further relates to a turbine of a turbine engine comprising a vane thus defined.

The invention further relates to a turbine engine comprising a turbine thus defined.

BRIEF DESCRIPTION OF THE FIGURES

FIG. 3 is a schematic perspective view of a regular helical shape;

FIG. 4 is a perspective view of a helical element of the vane according to the invention;

FIG. 5 is a perspective view schematically showing a helical element implanted into an intake portion of the vane root according to the invention;

FIG. 6 is a perspective view of a plate supporting a helical element according to the invention;

DETAILED DESCRIPTION OF THE SPECIFIC EMBODIMENTS

The idea on which the invention is based involves rotating the air during the intake thereof at the blade root by means of a helical shape in order to feed the circuit with swirling air to improve the heat exchanges.

Figure 1:
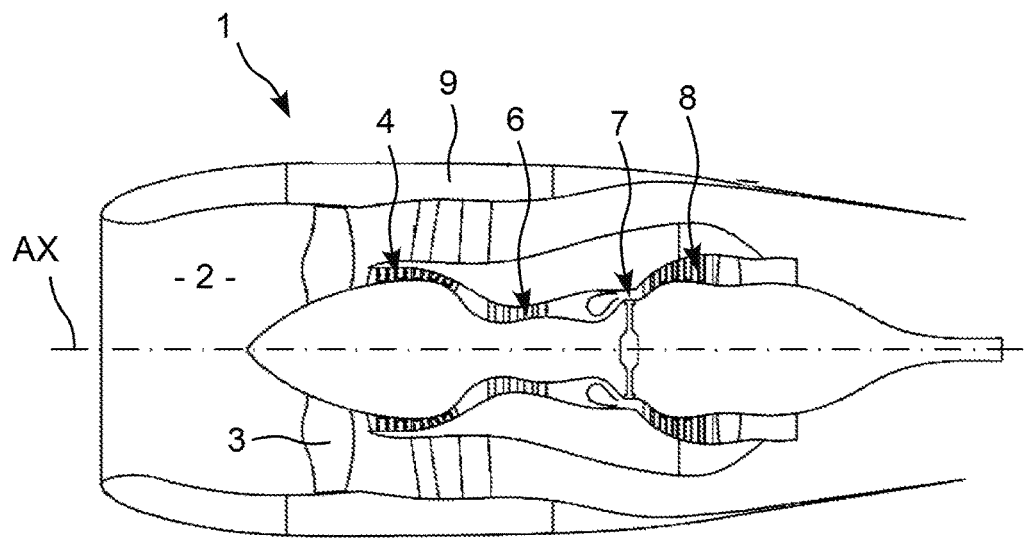
FIG. 1, described above, shows a sectional side view of a bypass turbojet engine according to the prior art.
Figure 2:
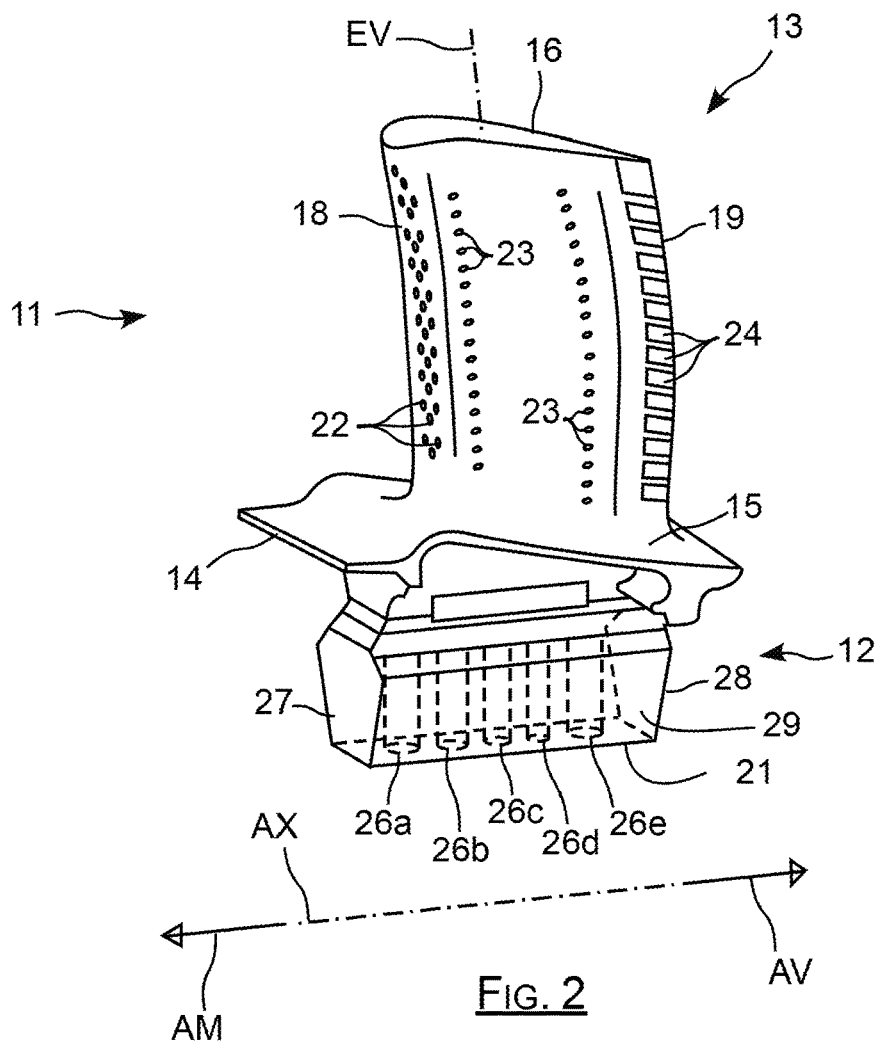
FIG. 2 is a perspective overview of a high-pressure vane of a turbine of a turbojet engine.

Such a vane, which is given the reference numeral 11 in FIG. 2, comprises a root 12 via which it is fastened to a turbine disc, not shown, and a blade 13 supported by said root 12, with an intermediate region 14 referred to as a platform extending roughly parallel to the rotational axis AX of the engine.

The blade 13 extends in a spanwise direction EV close to a radial direction relative to the axis AX, from a base 15 via which it is connected to the platform 14, to an apex 16. It extends longitudinally from a leading edge 18 to a trailing edge 19, which are parallel to the spanwise direction EV, the leading edge 18 corresponding to the region situated upstream AM of the blade 13, the trailing edge 19 corresponding to the downstream region AV thereof, relative to the direction of flow of the fluid.

The vane 11, i.e. the assembly that constitutes the root 12 and the blade 13 with the platform 14 is a one-piece cast comprising, in this case, five inner ducts in which the cooling air circulates. Each duct comprises an intake portion in the form of a smooth cylindrical hole extending in the root 12, which opens out onto a lower surface 21 of the root 12 to collect the air, and which on the other hand extends into the vane to form an air circulation line.

The walls of the blade 13 comprise series of through-holes 22, 23 and slots 24 discharging the cooling air circulating in the inner lines of said blade 13.

The five cylindrical intake portions extending in the root 12 are given the reference numerals 26a-26e in the figures, whereby the corresponding lines weaving through the blade 13 are not shown for simplicity purposes.

The five intake portions 26a-26e extend in the root 12 which itself has an overall box-shaped delimited by the planar lower surface 21 thereof parallel to the axis AX, by an upstream surface and by a downstream surface 27, 28 that are substantially planar and the orientation whereof is normal to the axis AX, and by two side surfaces 29, 31. In practice, the side surfaces of said root have toothed shapes thanks to which said root 12 constitutes the fastener via which the vane is secured to the disc, the lower surface 21 being that opposite the blade 12.

According to the invention, a helical element, i.e. an element of the helicoid type 32 shown in FIG. 3, is intended to be placed in one or more of the smooth cylindrical intake portions, in order to swirl the cooling air during the intake thereof in the blade root 12.

The helicoid 32 in FIG. 3 has a regular shape resembling that of an endless screw, i.e. having a pitch that is constant throughout the height thereof.

However, the shape selected for the helical element of the vane is advantageously optimised in order to advantageously have a pitch that decreases along the height thereof, so as to rotate the air entering the vane root in a gradual manner so as to limit the pressure loss induced thereby. In this context, the variation in pitch is not necessarily linear.

The pitch, which is defined as the height over which the edge of the helical element 33 traces a full revolution about the axis thereof, decreases from the base 34 of the element, situated at the surface 21, as far as the apex 36 thereof, situated inside the intake portion.

In other words, said helical element 33 has, at the base 34 thereof, an almost planar shape, corresponding to a low torsion or to a very high pitch, and conversely has, at the apex 36 thereof, a high torsion corresponding to a much lower pitch.

In the example shown in FIG. 4, the helical element 33 has a total torsional angle equal to one thousand and eighty degrees, which is formed over the entire height thereof. In general, this total torsional angle advantageously lies in the range thirty degrees to one thousand and eighty degrees, i.e. between one twelfth of a revolution and three revolutions.

In the example shown in the figures, the height of the helical element 33 corresponds to that of the cylindrical intake portion 26a, which is about half of the height of the blade root 12 measured radially relative to the rotational axis AX of the engine.

However, the height of the helical element does not necessarily correspond to that of the intake portion: it is also determined with other parameters defining said helical element, in particular such as the pitch and the law of evolution thereof, based on digital operating simulations. This height advantageously lies in the range twenty to one hundred percent of the height of the intake portion.

In general, said helical element 33 has a shape corresponding to that of a rectangular plate that is twisted half a turn about a radial axis AR relative to the axis AX, the orientation whereof is close to that of the spanwise axis EV of the vane. As it is understood, the rectangular base plate has a length corresponding to that of the cylindrical intake portion and a width corresponding to the diameter of said portion.

As shown in FIG. 5, said helical element 33 is integrated into the intake portion 26b of the blade 12 such that the base thereof is situated at the surface 21 of the blade root 12 and such that the apex thereof is situated in the body of the blade root 12, at the region in which said intake portion opens out into a cooling portion of the vane.

The helical element 33 is produced with the vane by moulding, as it is the case in FIG. 5, such that the moulded vane instantly integrates, into the one or more intake portions 26a-26e thereof, one or more helical elements rotating the cooling air in order to boost the efficiency of this cooling.

Figure 9:
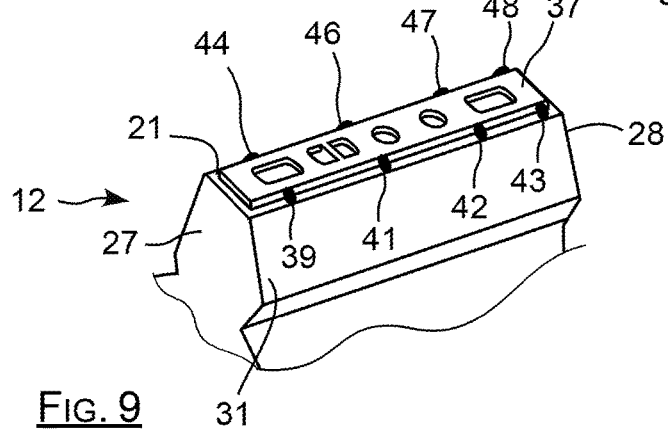
FIG. 9 is a perspective view showing a lower surface of the vane root to which a plate is welded, said plate supporting a helical element according to the invention.

In order to simplify production, and also to integrate the element into a vane, which is devoid thereof, said helical element 33 is advantageously supported by a calibrated plate 37, as shown in FIG. 6, which is added and welded against the surface 21 of the vane root 12 after the moulding of the body of said vane 12 as diagrammatically shown in FIG. 9.

As shown in FIG. 6, such a calibrated plate 37 has a planar rectangular shape comprising, for each intake portion 26a-26e, a corresponding hole 38a-38e having a section, the area whereof is calibrated, so as to adjust the rate of the air flow entering each intake portion 26*a*-26*e* with regard to the operating restrictions.

The base 34 of the helical element 33 extends inside the hole 38*a* of the plate 37 in order to divide it into two parts, the sections whereof are identical, and said helical element 33 extends relative to said plate 37 such that the torsional axis thereof is oriented substantially perpendicularly to that in the example shown in the figures.

The helical element 33 and the plate 37 can be separate elements secured to one another by welding, before mounting the assembly and fastening the plate 37 to the surface 21 of the root 12 by means, for example, of welding tacks 39-48 welding the edges of said plate 37 to the surface 21, as shown in FIG. 9. In such a case, the ends of the base 34 of the helical element are welded to the inner edge of the corresponding calibrated hole in order to fasten said element to the plate.

Figure 7:
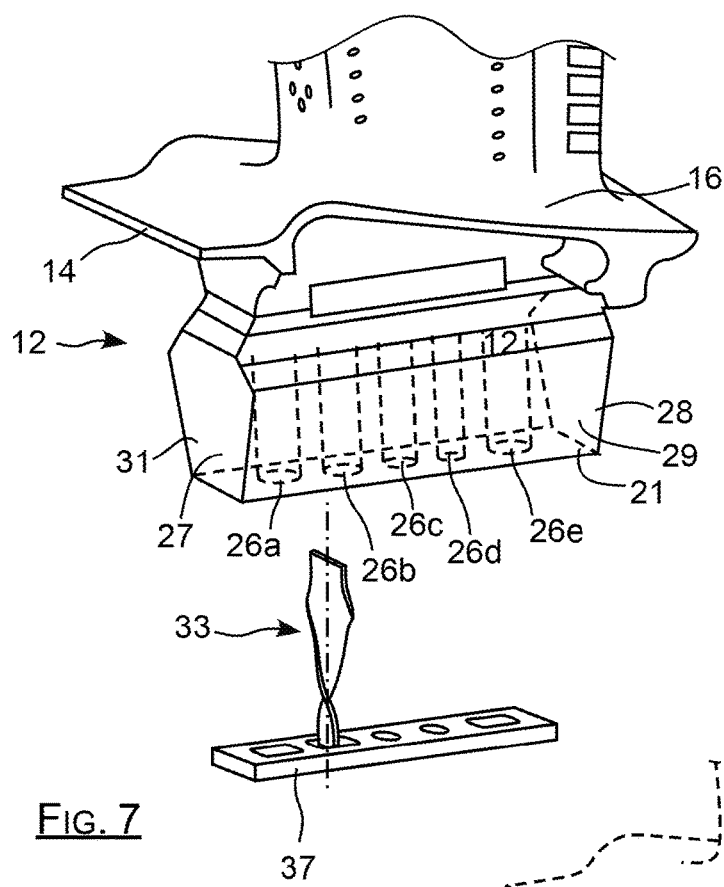
FIG. 7 is a perspective view showing the assembly of a plate supporting a helical element for the vane according to the invention.
Figure 8:
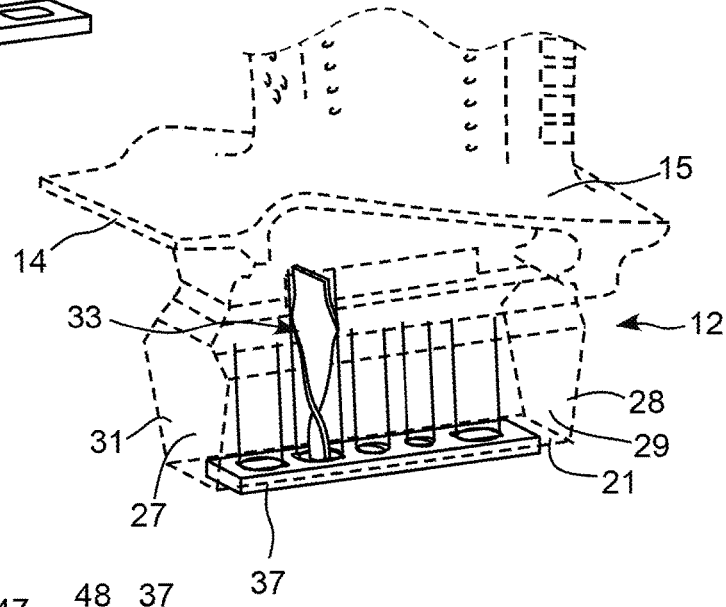
FIG. 8 is a perspective view showing a plate supporting a helical element equipping the vane according to the invention.

As shown in FIG. 7, the assembly of the plate 37 with the one or more helical elements 33 thereof mainly consists of presenting it facing the surface 21, in order to engage each helical element in the corresponding intake portion until the plate 37 is brought into contact with the surface 21. The plate can then be welded to the surface 21.

In the example shown in the figures, the vane is provided with a single helical element 33 equipping the intake portion 26*b*, however the vane can also be provided with a plurality of helical elements equipping all or part of the different intake portions comprised by the root thereof. These helical elements can be moulded with the vane body or subsequently fixed thereto.

In the case of a plurality of helical elements, they can have different characteristics, in particular with regard to the torsional angles thereof, the evolution of the torsion thereof from the bases to the respective apexes thereof, and the heights thereof. These characteristics are determined by calculation or simulation in order to optimise cooling for each intake portion. The vane can thus comprise one helical element in each intake portion and each helicoid can be different from the others.

The helical elements can be produced separately, for example by the torsion of rectangular sheet metal elements, and fixed to the calibration plate by welding. They can also be obtained directly by additive manufacturing of the vane, or can be produced in one piece with the calibration plate by casting or by additive manufacturing.

The choice of helical elements supported by the calibration plate for fixing to the vane root in particular allows existing vanes to be provided with helical elements, without requiring modifications to be made to the design of the vane body.

As it is understood, the helical elements rotate the air upon the intake thereof in the blade root to swirl said air so as to increase the heat exchanges taking place in the ducts by introducing turbulence therein. These exchanges are thus improved, including in the intake portions passing through the blade root, which provides benefits including greater uniformity in the cooling of said blade, thus contributing to the increased mechanical strength thereof.

What is claimed is:

1. A turbine vane for a turbine engine such as a turboprop or a turbojet engine, said vane comprising a vane root supporting a blade, said vane including at least one air-circulation duct for cooling the vane during operation, said duct including, at the vane root, intake portions for collecting cooling air, said intake portions extending away from a lower surface of the vane root opposite to the blade, wherein at least one of said intake portions is provided with a helical element, having a base located at the lower surface of the vane root and extending into the vane root for swirling the cooling air in the at least one of said intake portions in order to improve the cooling efficiency thereof, wherein a calibrated plate is fixed to the lower surface of the vane root, said calibrated plate comprising holes for adjusting a rate of an intake air flow in each duct, wherein the helical element and the calibrated plate are a one-piece unitary element, wherein the helical element has a height that is twenty percent of a height of the intake portion that the helical element is disposed within.

2. The turbine vane according to claim 1, wherein the calibrated plate is secured to the lower surface of the vane root by welding or brazing.

3. The turbine vane according to claim 1, wherein the helical element has a total torsional angle that lies in a range thirty degrees to one thousand and eighty degrees.

4. The turbine vane according to claim 1, wherein the helical element has a non-constant pitch, which decreases from the base of said helical element to an apex of said helical element.

5. A turbine of a turbine engine comprising a turbine vane according to claim 1.

6. A turbine engine comprising a turbine according to claim 5.

7. A method of manufacturing a turbine vane according to claim 1, wherein the turbine vane is obtained by moulding and wherein the helical element is moulded with the turbine vane.

8. A method of manufacturing a turbine vane according to claim 1, wherein the turbine vane is obtained by additive manufacturing.

9. A turbine vane for a turbine engine such as a turboprop or a turbojet engine, said vane comprising a vane root supporting a blade, said vane including at least one air-circulation duct for cooling the vane during operation, said duct including, at the vane root, intake portions for collecting cooling air, said intake portions extending away from a lower surface of the vane root opposite to the blade, wherein at least one of said intake portions is provided with a helical element, having a base located at the lower surface of the vane root and extending into the vane root for swirling the cooling air in the at least one of said intake portions in order to improve the cooling efficiency thereof, wherein a calibrated plate is fixed to the lower surface of the vane root, said calibrated plate comprising holes for adjusting a rate of an intake air flow in each duct, and wherein a weld secures an end of the base of the helical element to an inner edge of a corresponding hole of the calibrated plate, wherein the helical element has a height that is twenty percent of a height of the intake portion that the helical element is disposed within.

10. A turbine vane for a turbine engine such as a turboprop or a turbojet engine, said vane comprising a vane root supporting a blade, said vane including a plurality of air-circulation ducts for cooling the vane during operation, each duct including, at the vane root, a cylindrical intake portion for collecting cooling air wherein said cylindrical intake portions extend away from a lower surface of the vane root opposite to the blade, wherein at least two of said cylindrical intake portions are provided with a helical element, having a base located at the lower surface of the vane root, for swirling the cooling air in order to improve the cooling efficiency thereof, wherein a calibrated plate is fixed to the lower surface of the vane root, said calibrated plate comprising holes for adjusting a rate of an intake air flow in each duct, wherein the helical elements of the at least two cylindrical intake portions and the calibrated plate are a one-piece unitary element, wherein the helical element has a height that is twenty percent of a height of the intake portion that the helical element is disposed within.

11. The turbine vane according to claim 10, wherein the calibrated plate is secured to the lower surface of the vane root by welding or brazing.

12. The turbine vane according to claim 10, wherein the helical elements of the at least two cylindrical intake portions have total torsional angles that lie in a range thirty degrees to one thousand and eighty degrees.

13. The turbine vane according to claim 10, wherein the helical elements of the at least two cylindrical intake portions have non-constant pitches, which decrease from the base of each helical element to an apex of said helical element.

14. The turbine vane according to claim 10, wherein the helical elements of the at least two cylindrical intake portions divide a corresponding hole of the calibrated plate into identical parts.

* * * * *